United States Patent [19]

Leiber et al.

[11] 4,309,060
[45] Jan. 5, 1982

[54] ANTI-LOCKING WHEEL CONTROL SYSTEM

[75] Inventors: Heinz Leiber; Volker Braschel, both of Leimen; Wolf-Dieter Jonner; Hans-Herbert Wupper, both of Sandhausen, all of Fed. Rep. of Germany

[73] Assignee: Robert Bosch GmbH, Stuttgart, Fed. Rep. of Germany

[21] Appl. No.: 952,351

[22] Filed: Oct. 18, 1978

[30] Foreign Application Priority Data

Dec. 28, 1977 [DE] Fed. Rep. of Germany ....... 2758529

[51] Int. Cl.³ .................................................. B60T 8/04
[52] U.S. Cl. ...................................... 303/106; 303/105
[58] Field of Search .............. 188/181; 303/20, 91–93, 303/103, 105, 106, 111

[56] References Cited

U.S. PATENT DOCUMENTS

| | | | |
|---|---|---|---|
| 3,542,437 | 11/1970 | Leiber et al. | 303/20 X |
| 3,697,139 | 10/1972 | Elliott et al. | 303/91 |
| 3,790,227 | 2/1974 | Dozier | 303/106 |
| 3,833,268 | 9/1974 | Fleagle | 303/106 |
| 3,930,688 | 1/1976 | Rau et al. | 303/106 |

FOREIGN PATENT DOCUMENTS

| | | | |
|---|---|---|---|
| 2050328 | 4/1972 | Fed. Rep. of Germany | 303/106 |
| 2146825 | 3/1973 | Fed. Rep. of Germany | 303/105 |
| 2206807 | 8/1973 | Fed. Rep. of Germany | 303/106 |
| 2258317 | 6/1974 | Fed. Rep. of Germany | 303/106 |

*Primary Examiner*—J. D. Miller
*Assistant Examiner*—Reinhard J. Eisenzopf
*Attorney, Agent, or Firm*—Edwin E. Greigg

[57] ABSTRACT

The invention relates to an anti-locking wheel control system in which control signals for the variation of the brake pressure are derived from the rotary motion behavior of the vehicle wheels and in which a test circuit is provided, which initiates a test for at least one wheel brake when a signal appears which indicates a tendency toward locking, in which test the over-braked vehicle wheel enters a state of high slippage, whereby the test circuit determines how the wheel behaves at the given coefficient of friction between the road surfaces and the tire, and whereby on the basis of this determination, the test circuit either provides a state in which the brake pressure is regulated or else switches to a state in which the control is made ineffective for at least some of the wheel brakes.

20 Claims, 8 Drawing Figures

ANTI-LOCKING WHEEL CONTROL SYSTEM

BACKGROUND OF THE INVENTION

A generally similar anti-locking wheel control system is disclosed in the German laid-open application No. 22 58 317. The object of this known system is to recognize the special situations for the control system in which, despite the effective operation of the regulator, in the "wheels locked" state, the stopping distance is lengthened. Such special situations arise when driving on deep snow, slush, sand, gravel, etc., or with road conditions where a locked wheel penetrates a layer of limited frictional value and slides further onto a layer having a higher frictional value, while a regulated wheel rolls over the layer of limited frictional value.

In the known system, it is proposed to interrupt the control of one or more wheels at intervals when a danger of locking arises and thus to cause the wheel or wheels to lock. In accordance with the first proposed embodiment, the control is made ineffective at least on some of the wheels when the vehicle deceleration is between approximately 0.2 g and 0.5 g. In accordance with a second possible embodiment, it is determined whether the vehicle deceleration is greater with the control system operating or with locked wheels and on the basis of this comparison, the control system is switched off as necessary.

In accordance with a third proposed embodiment, the acceleration behavior of the wheel which is made to lock is monitored while the brakes are released. If the wheel acceleration is between 0.5 g and 2 g, then the control system is switched off.

OBJECT AND SUMMARY OF THE INVENTION

The object of the invention is to provide a test circuit such that the above-described special situations can be recognized without the aid of separate measurement devices and prior to the acceleration phase of the wheel.

This object is attained by means of one embodiment of the test circuit such that the brake pressure is kept substantially constant during the test and further that, by monitoring the wheel during the deceleration phase, it is determined whether the vehicle wheel is running on a base which has a coefficient of friction $\mu$; above a higher slippage value on such a base, the $\mu$-slippage curve rises with increasing slippage, whereby the control system is made ineffective if such a coefficient of friction is present.

An anti-locking wheel control system operates at its best by producing a shortened stopping distance, if, as is usually the case, there is a $\mu$-slippage curve in accordance with that shown in FIG. 1. In contrast thereto, such a control system causes a lengthening of the stopping distance compared to locked wheels, if the $\mu$-slippage curve takes the course shown in FIG. 2; that is, when there is increased slippage, the coefficient of friction rises. This is the case, for example, with slush.

The presence of such a road condition can be recognized in accordance with the invention by means of having the wheel or wheels, at a constant brake pressure, attain a variably low speed above zero, which is approximately constant, but not to have the wheel or wheels lock, since after all the coefficient of friction rises with increased slippage. To accomplish this, one may measure the speed directly or measure just the amount of slippage. In this way, it is favorably determined whether the slippage or the wheel speed remains approximately constant over a given time period. Further, a preferably narrow range of wheel speed near zero is eliminated; that is, the control system is only switched off if the very low speed value $v_{min}$ or the correspondingly high slippage value near 1 (one) is not attained.

The conditions which being about the course of the $\mu$-slippage curve shown in FIG. 2 can also be recognized by means of observing, while the brake pressure which induces the locking tendency is maintained, whether the wheel deceleration drops below a given value before a low wheel speed $v_{min}$ is attained. Here the deceleration itself may be evaluated, or the speed drop as well.

There are also road conditions which result in a course of the $\mu$-slippage curve in accordance with FIG. 3. In this event as well, the brake operation is better with locked wheels than with the control system operating because the coefficient of friction rises when locking takes place. The presence of such road conditions may be recognized by means of measuring whether, after a wheel speed drops to below $v_{min}$ near zero, the slippage is reduced. This signal indicating the reduction of slippage may also be, for example, an acceleration signal. A multiple appearance, in particular, two appearances of the signal indicating slippage reduction is preferably used as the criterion for switching off the control system.

In order to recognize the drop in slippage, the exceeding of the threshold $v_{min}$ can also be used, or when a further threshold is available in a nearby range then the exceeding of both speed thresholds can be used. One can also recognize the presence of the state shown in FIG. 3 or 6 by monitoring the exceeding or dropping below of the thresholds. The recognition of the presence of road conditions in accordance with FIG. 3 can be accomplished by using the methods described in connection with FIG. 6 together with the methods described in connection with FIGS. 4 and 5, but the methods of FIG. 6 may also be employed without the simultaneous use of the methods of FIGS. 4 and 5.

The test is preferably initiated at the beginning of a control procedure. If the test leads to switching off of the control system, then after a given time, one can initiate a new test in order to determine whether the indicated conditions are still present.

Only the front wheels are preferably included in the test, and the test is preferably conducted on both front wheels simultaneously. It is advantageous to switch off the control system only when the switchover criteria appear at both wheels. It is also logical to initiate the test only when the vehicle speed is lower than, for example, 60 km per hour. Similarly the test should not be initiated when the vehicle is driving around a curve; that is, when a steering angle of a given magnitude or a crosswise acceleration of a corresponding extent is present. Similarly, one can preclude the test or not initiate it, if the vehicle deceleration is larger than 0.5 g, since then, the above-described special situations are not present.

Preferably the driver is made aware of the switching off of the control system by the switching on of a warning device.

The invention will be better understood as well as further objects and advantages thereof become more apparent from the ensuing detailed description of a preferred embodiment taken in conjunction with the drawings.

DESCRIPTION OF THE PREFERRED EMBODIMENT

Figure 4:
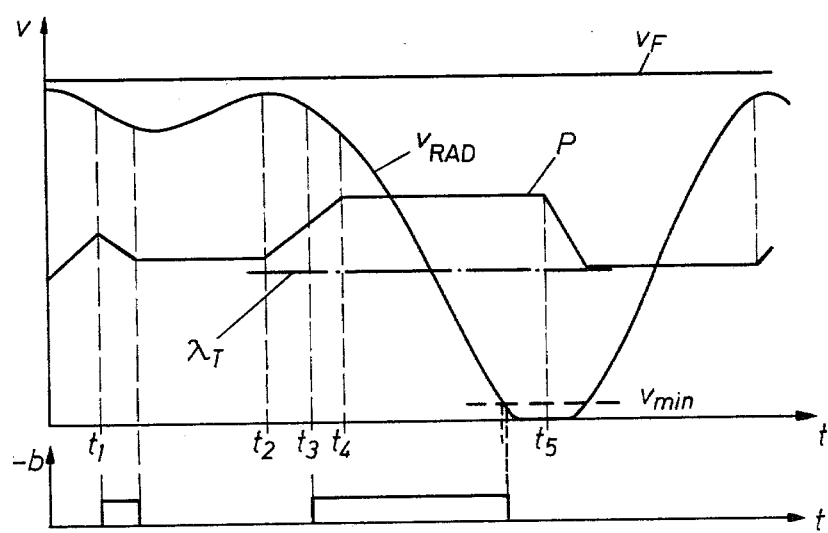
FIG. 4 is a graph illustrating a course for the wheel speed and the brake pressure when the test is initiated and at road conditions in accordance with the curve of FIG. 1.

In FIG. 4 of the drawing, the course of the wheel speed $v_{Rad}$ and that of the brake pressure P is plotted over the time required for one test cycle. These courses are associated with the $\mu$-slippage curve in accordance with FIG. 1, that is, under normal road conditions. The brake pressure which rises up to time $t_1$ makes the wheel decelerate; the pressure drop and the maintenance of constant pressure caused by the control procedure up to time $t_2$ causes the wheel again to accelerate. Because of the signal which now follows and which indicates the tendency toward locking, for example a deceleration signal at time $t_3$, the system switches over between time $t_4$ to $t_5$ from pressure build-up to pressure maintenance by means of the test circuit, either somewhat delayed or after an additional differential speed at time $t_4$. The over-brake wheel therefore loses speed until it finally locks at time $t_5$.

Figure 1:
FIG. 1 is a graph illustrating one course for a $\mu$-slippage curve.

The test circuit to be described hereinafter in connection with FIG. 8 here determines that the speed has dropped below a minimum level $v_{min}$ near zero, and that this drop in speed occurred before the deceleration signal ($-b$) shown in FIG. 4 disappears. The deceleration signal ($-b$) is generated when a given wheel deceleration value is exceeded. From the sequence of these events with respect to time, the presence of the $\mu$-slippage curve of FIG. 1 is determined; thus the control system is not switched off and instead the control system begins to operate again after the pressure maintenance period is ended at time $t_5$.

The $\lambda_T$ threshold plotted in FIG. 4 can be used to observe whether the wheel slippage exceeds this threshold value over a given period of time. If this is not the case, then the test is interrupted and is repeated as often as necessary or at least the test results are not utilized. By this means, incorrect measurements are avoided.

Figure 2:
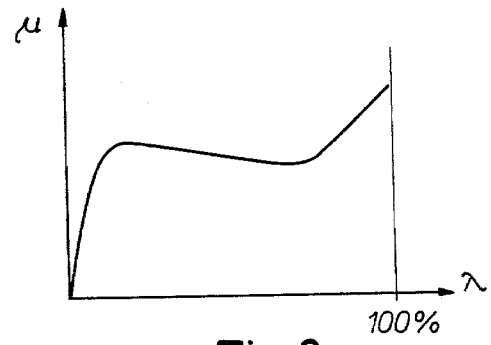
FIG. 2 is a graph illustrating another course for a $\mu$-slippage curve.

If, in contrast, a course of the $\mu$-slippage curve such as that shown in FIG. 2 is present, then the wheel attains a velocity in the range of high slippage wherein, because of the increased $\mu$, the wheel continues to rotate, so that locking does not take place. The deceleration signal ($-b$) here disappears before the speed $v_{min}$ is attained. The test circuit thus suppresses the control system; that is, after the pressure maintenance phase ends, pressure is reduced and the wheel is caused to lock.

Figure 3:
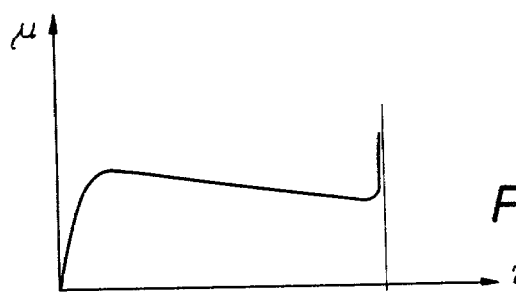
FIG. 3 is a graph illustrating still another course for a $\mu$-slippage curve.
Figure 6:
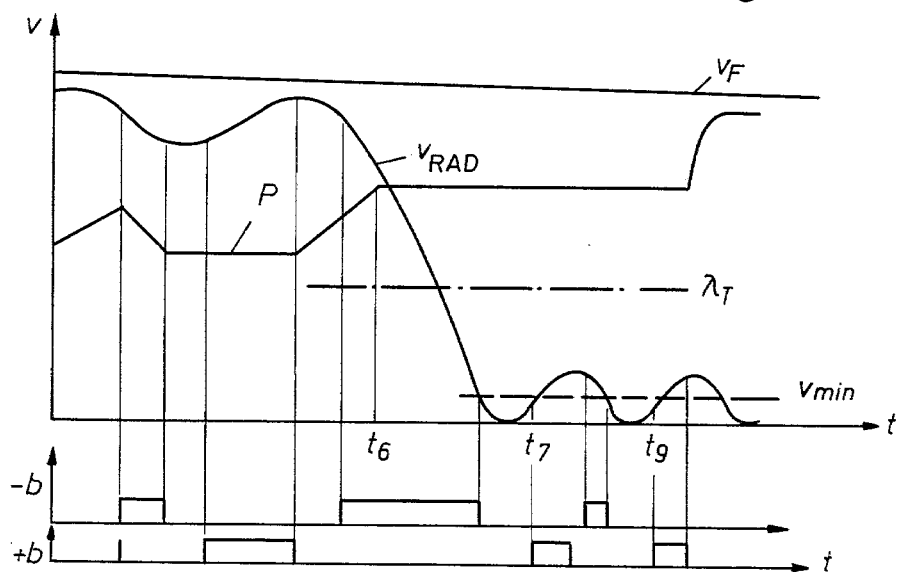
FIG. 6 is a graph similar to FIG. 4 illustrating still another course in accordance with the curve of FIG. 3.

When road conditions in accordance with the $\mu$-slippage curve of FIG. 3 are present, the wheel locks after the initiation of the test at time $t_6$ (as shown in FIG. 6). However, since here the coefficient of friction suddenly rises when locking takes place, the wheel again accelerates, which triggers an acceleration signal (+b) at time $t_7$. As soon as the wheel rotates, the coefficient of friction again drops. However, the wheel again decelerates. This course of events occurs repeatedly. The test circuit can now be so designed that at the second +b signal in one test cycle, the test circuit responds and then blocks the control system, so that after the maintenance phase, the pressure rises and the wheel is caused to lock. The $\lambda_T$ threshold can be utilized with this method as well.

Figure 7:
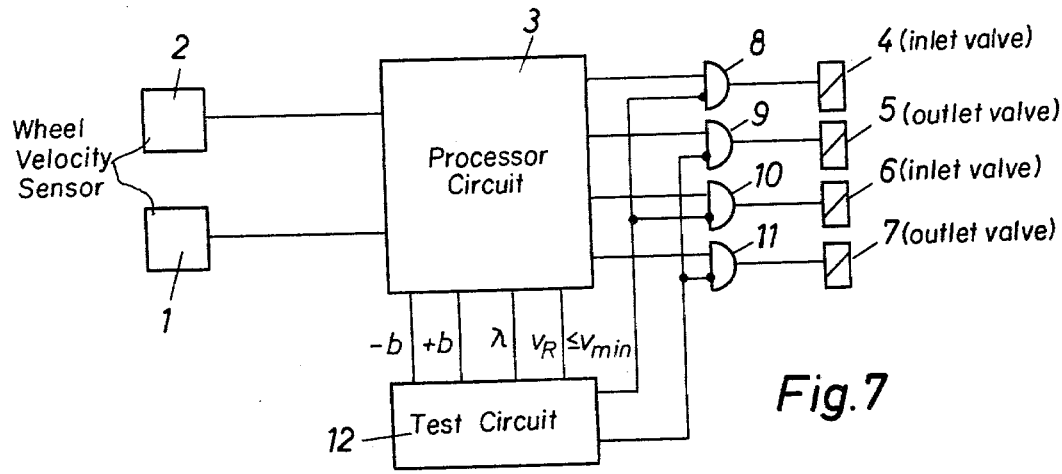
FIG. 7 shows an embodiment of the anti-locking wheel control system of the invention in conceptual representation.

An exemplary embodiment of an anti-locking wheel control system will now be described with the aid of FIGS. 7 and 8. In FIG. 7, there is shown two pickup elements 1 and 2 for the wheel velocity of two vehicle wheels, a processor circuit 3, and inlet valves 4 and 6 as well as outlet valves 5 and 7 associated with the brakes of the two vehicles wheels. The valves 4–7 are opened by the processor circuit 3 via the AND gates 8–11 and regulate the brake pressure at the wheels in accordance with the transmitted wheel motion behavior. The test circuit 12 triggers the test cycle and causes the blocking of the opening of the valves 4–7 by the gates 8–11 with the aid of the signals $-b$, $+b$, $\lambda$ and $v_{Rad} \leq v_{min}$.

Figure 8:
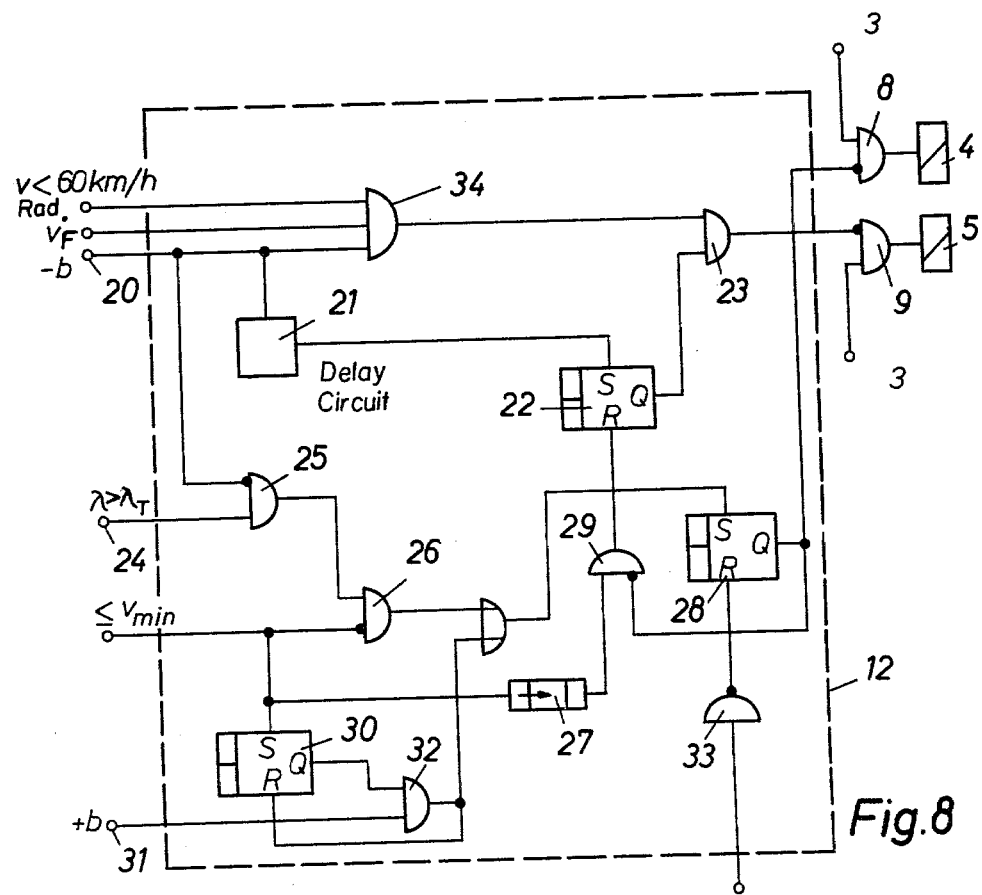
FIG. 8 shows an embodiment of a test circuit.

The test circuit 12 is shown in detail in FIG. 8 together with the gates 8 and 9 and the valves 4 and 5. The ($-b$) signal arriving at terminal 20 from the processor circuit 3 is delivered to the block 21, which, after the signal has appeared twice in one control procedure and with some delay, transmits a set signal to the bistable circuit or flip-flop 22 and thus initiates the test. The signal which then appears at the output Q of flip-flop 22 is delivered to the gate 23, which then, so long as a ($-b$) signal is present, blocks the opening of the outlet valve 5. Since, when a deceleration signal ($-b$) is present, the inlet valve 4 is opened the resulting pressure is maintained at a constant level.

By means of the AND gates 25 and 26 it can be determined whether conditions are present which correspond to the $\mu$-slippage curves of FIG. 1 or 2. To this end, the deceleration signal ($-b$) is supplied in inverted form to the gate 25. A slippage signal, that is, one which is generated above a definite level of wheel slippage, is supplied via terminal 24. Thus an output signal from the gate 25 is present when the deceleration signal ($-b$) disappears, at a slippage of $\lambda$. This output signal is further transmitted via the AND gate 26, if it appears before the wheel velocity drops below $v_{min}$. Thus no output signal is generated when the $\mu$-slippage curves of FIGS. 1 and 3 are present. In this case, by reason of the timing member 27, an input signal appears at the reset input of the bistable circuit or flip-flop 22, at some predetermined interval after the speed has dropped below $v_{min}$, so that the blockage of the AND gate 9 is terminated. Since the high level of slippage which is present produces a pressure drop via the logic circuit of the processor circuit 3, then a pressure drop occurs after the time $t_5$ of FIG. 4.

Figure 5:
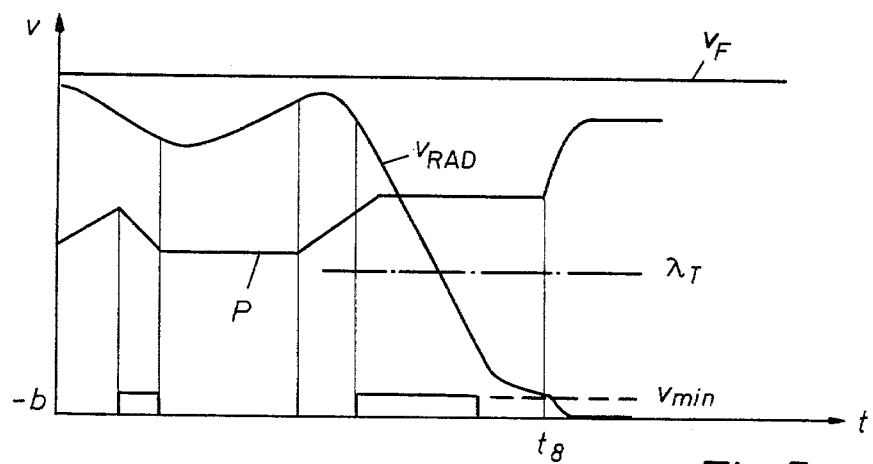
FIG. 5 is a graph similar to FIG. 4 illustrating another course in accordance with the curve of FIG. 2.

If, on the contrary, a signal appears at the output of gate 26 (as in FIG. 2), then this signal sets the bistable circuit or flip-flop 28, which then prevents a further opening of the valve 4 by blocking the gate 8. Thus, the inlet valve 4 opens and, as is shown in FIG. 5 at time $t_8$, the pressure is dropped and the wheel is locked. The resetting of the bistable element or flip-flop 22 via the timing device 27 is now prevented by the blockage of AND gate 29 by means of the output signal of the bistable circuit or flip-flop 28.

When the wheel velocity drops below $v_{min}$, the bistable element 30 is also set. Thus, AND gate 32 is conditioned, which sends a (+b) signal to the terminal 31 which signal has appeared on this line for its second appearance in a test cycle. By this means, the bistable element or flip-flop 28 is switched over or set, which blocks gate 8 and thus triggers a pressure drop at time $t_9$ as shown in FIG. 6. If no (+b) signal appears, then the control operation takes place from time $t_5$ as shown in FIG. 4, with the aid of the timing device 27. If the control of the brake pressure has been switched off by the setting of flip-flop 28, then the shutoff of the control system ends when the control ends. A signal characterizing the control operation is inverted in the inverter 33 and thus resets the bistable element or flip-flop 28 at the end of the control operation, which now in turn unblocks the gate 29. Thus, the bistable circuit or flip-flop 22 is also reset with the signal $v_{Rad}=v_{min}$, which has, in the meantime, been delayed by the time delay of the timing device 27.

Briefly, the following operations take place:

when the test is initiated, a pressure drop is prevented by means of control signals;

if (−b) ends after the appearance of the velocity $v_{Rad} \leq v_{min}$, then the control is again made effective as shown in FIG. 4;

if (−b) ends before the appearance of the velocity $v_{Rad} \leq v_{min}$, then the control system is blocked and the wheel is locked;

if (−b) ends after $v_{Rad} \leq v_{min}$ and if after the velocity had dropped below $v_{min}$, acceleration signals appear (or if the velocity $v_{min}$ is exceeded by $v_{Rad}$), then the control system is likewise switched off.

Furthermore, as shown in FIG. 8, the test cycle is only initiated by means of the AND gate 34 if the vehicle speed is lower than, for instance, 60 km per hour and the vehicle deceleration is, for example, $\leq 0.4$ g.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. An anti-locking wheel control system in which control signals for the variation of the brake pressure are derived from the rotary motion behavior of the vehicle wheels and in which a test circuit is provided, which initiates a test for at least one wheel brake when a signal appears which indicates a tendency toward locking, in which test the over-braked vehicle wheel enters a state of high slippage, whereby the test circuit determines how the wheel behaves at a given coefficient of friction between road surface and tire, and whereby on the basis of this determination, the test circuit either permits the state in which the brake pressure is regulated or else switches on the state in which the control system is made ineffective for at least some of the wheel brakes, characterized by means incorporated in said test circuit for maintaining the brake pressure substantially constant during the test and by means for determining by monitoring at least one wheel during the deceleration phase, whether the vehicle wheel is running on a base with a coefficient of friction $\mu$, where the $\mu$-slippage curve rises with increasing slippage above a predetermined slippage value whereby the control system is made ineffective if such a coefficient of friction is determined.

2. An anti-locking wheel control system in accordance with claim 1 wherein said test circuit includes means for determining whether the wheel enters a velocity which varies from zero.

3. An anti-locking wheel control system in accordance with claim 2 wherein said test circuit includes means for determining whether a slippage signal is present at least at one given time.

4. An anti-locking wheel control system in accordance with claim 3 wherein the slippage signal is processed only if in said given time the wheel velocity is higher than a given low velocity.

5. An anti-locking wheel control system in accordance with claim 1 wherein said test circuit includes means for determining whether the vehicle wheel undergoes a deceleration of a given amount by the time it attains a low wheel velocity $v_{min}$, whereby the control system is made ineffective if the deceleration drops below the given amount before said low wheel velocity $v_{min}$ is reached.

6. An anti-locking wheel control system in accordance with claim 1, including means for initiating a new test if a given amount of time has elapsed after the control system has been made ineffective.

7. An anti-locking wheel control system in accordance with claim 1, characterized in that only the front wheels are included in the test.

8. An anti-locking wheel control system in accordance with claim 7, characterized in that the test takes place simultaneously for both of said front wheels.

9. An anti-locking wheel control system in accordance with claim 8, characterized in that said control system is made ineffective by said test circuit only if the switchover criteria are determined for at least two wheels.

10. An anti-locking wheel control system in accordance with claim 9, characterized in that the test is initiated by said test circuitry only if the vehicle velocity is lower than a given value.

11. An anti-locking wheel control system in accordance with claim 10, including means for precluding the test by said test circuit if the longitudinal deceleration is larger than approximately 0.5 g.

12. An anti-locking wheel control system in accordance with claim 11, characterized in that when a switchoff signal appears, the control system for controlling the brakes of the front axle is made alternatively effective and ineffective and that the control system for controlling the brakes of the rear axle is continuously effective.

13. An anti-locking wheel control system in accordance with claim 12, including switching means for determining subsequent to the initiation of the test by said test circuit whether, over a given time period, the wheel slippage exceeds a given value $\lambda_T$ for a given time period and said switching means being adapted to allow the test to continue for utilization of the results of the test.

14. An anti-locking wheel control system in accordance with claim 13, characterized in that said test is first initiated by said test circuit at least at the second appearance of the signal indicating the tendency of the wheel to lock.

15. An anti-locking wheel control system in accordance with claim 8, including means for periodically changing the brake pressure for at least some of the wheels when the control system has been made ineffective.

16. An anti-locking wheel control system in accordance with claim 15, characterized in that the brake pressure of the rear wheels is periodically changed.

17. An anti-locking wheel control system in accordance with claim 15, characterized in that the pressure at the front wheels is periodically changed and the control at the rear axle wheels is maintained.

18. An anti-locking wheel control system in which control signals for the variation of the brake pressure are derived from the rotary motion behavior of the vehicle wheels and in which a test circuit is provided which initiates a test for at least one wheel brake when a signal appears which indicates a tendency toward locking, in which test the over-braked vehicle wheel enters a state of high slippage, whereby the test circuit determines how the wheel behaves at a given coefficient of friction between road surface and tire, and whereby on the basis of this determination the test circuit either permits the state in which the brake pressure is regulated or else switches on the state in which the control is made ineffective for at least some of the wheel brakes, characterized by means incorporated in said test circuit for maintaining the the brake pressure substantially constant during the test and means in said test circuit for making the control system ineffective, if a signal indicating a reduction of slippage appears after the wheel velocity has dropped below a low velocity $v_{min}$.

19. An anti-locking wheel control system in accordance with claim 18, including means for making the control system ineffective if the signal indicating the reduction of slippage has made a multiple appearance.

20. An anti-locking wheel control system in accordance with claim 18, characterized in that the signal indicating the slippage reduction is an acceleration signal.

* * * * *